US009136748B2

(12) United States Patent
Ochiai

(10) Patent No.: US 9,136,748 B2
(45) Date of Patent: Sep. 15, 2015

(54) VARIABLE RELUCTANCE RESOLVER

(75) Inventor: Takaaki Ochiai, Kitasaku-gun (JP)

(73) Assignee: MINEBEA CO., LTD., Kitasaku-Gun (JP)

( * ) Notice: Subject to any disclaimer, the term of this patent is extended or adjusted under 35 U.S.C. 154(b) by 127 days.

(21) Appl. No.: 13/554,658

(22) Filed: Jul. 20, 2012

(65) Prior Publication Data

US 2013/0049742 A1    Feb. 28, 2013

(30) Foreign Application Priority Data

Aug. 30, 2011   (JP) .................................. 2011-186862

(51) Int. Cl.
| | |
|---|---|
| G01B 7/30 | (2006.01) |
| H02K 24/00 | (2006.01) |
| G01D 5/20 | (2006.01) |
| H02K 3/52 | (2006.01) |
| H02K 5/22 | (2006.01) |

(52) U.S. Cl.
CPC .............. *H02K 24/00* (2013.01); *G01D 5/2013* (2013.01); *H02K 3/522* (2013.01); *H02K 5/225* (2013.01)

(58) Field of Classification Search
CPC ..... H02K 3/5222; G01D 11/245; G01P 3/465
USPC ....................................... 324/207.16, 207.25
See application file for complete search history.

(56) References Cited

U.S. PATENT DOCUMENTS

| | | | |
|---|---|---|---|
| 2003/0030349 A1* | 2/2003 | Kobayashi et al. ........... 310/254 |
| 2003/0071527 A1* | 4/2003 | Tetsuka et al. .................. 310/71 |
| 2004/0046464 A1* | 3/2004 | Sano et al. ...................... 310/71 |

FOREIGN PATENT DOCUMENTS

| | | |
|---|---|---|
| JP | 2002-107109 A | 4/2002 |
| JP | 2009-027841 A | 2/2009 |
| JP | A-2009-27841 | 2/2009 |

* cited by examiner

*Primary Examiner* — Reena Aurora
(74) *Attorney, Agent, or Firm* — Oliff PLC

(57) ABSTRACT

In a variable reluctance resolver having terminal pins at an insulator, a technique for preventing deformation of the terminal pins, shorting between the terminal pins, and contact failure at portions of the terminal pins is provided. A first insulator 300 is formed together with a terminal pin base 311 on which terminal pins 320 are provided. The terminal pins 320 are connected with end portions of windings of a stator coil 500. A cover 330 is mounted on the terminal pin base 311 by covering, and resin is filled inside the cover 330. The resin is also applied to the stator coil 500. The resin filled inside the cover 330 seals the terminal pins 320, and the cover 330 protects the terminal pins 320.

5 Claims, 8 Drawing Sheets

VARIABLE RELUCTANCE RESOLVER

BACKGROUND OF THE INVENTION

1. Field of the Invention

The present invention relates to a VR resolver (Variable Reluctance resolver) having a specific structure at a terminal portion to which a stator coil is connected.

2. Description of Related Art

Variable reluctance resolvers (VR resolvers) used for measurement of a rotating position are known. The VR resolver is formed by arranging a rotor, which is made of a magnetic material, in a stator. The stator has plural magnetic salient poles that are projected from a circular stator core toward a rotation center and that are wound with wires. The stator of the VR resolver has the following general structure. The stator core is formed by laminating plural circular yoke sheets that are formed by press cutting soft magnetic materials. The stator core is held between a pair of plastic resin insulators from top and bottom sides in an axial direction. While the pair of insulators insulates the stator core, the salient poles are wounded with wires, whereby a stator coil is formed of an exciting coil, a sine phase detection coil, and a cosine phase detection coil.

The rotor has plural convex portions corresponding to the salient poles of the stator core. While the rotor rotates, a distance between an outer circumferential surface of the rotor and each of the sine phase detection coil and the cosine phase detection coil, is periodically changed. In this case, if electric current is supplied to the exciting coil, induced currents induced by the sine phase detection coil and the cosine phase detection coil are periodically changed according to rotation angle of the rotor. By measuring the induced currents induced by the sine phase detection coil and the cosine phase detection coil, the rotation angle of the rotor is calculated at an RD converter (Resolver-digital converter). The insulator is provided with a terminal portion, and the terminal portion has terminal pins for outputting signals that are detected by the sine phase detection coil and the cosine phase detection coil, to the outside. End portions of the stator coil are connected with the terminal pins (For example, see Japanese Unexamined Patent Application Laid-open No. 2009-27841).

In the structure of the above terminal portion, the terminal pins are exposed. Therefore, when external load is applied to the terminal pins by contacting with other members, there is the possibility of deformation of the terminal pins and disconnection of lead portions of the windings. Moreover, there is the possibility of shorting and contact failure due to a drop of water, dust, or dirt, which enters between the adjacent terminal pins from the outside.

SUMMARY OF THE INVENTION

In view of these circumstances, it is an object of the present invention to provide a VR resolver having terminal pins at an insulator, in which deformation of the terminal pins, shorting between the terminal pins, and contact failure at portions of the terminal pins, are prevented.

According to a first aspect of the present invention, the present invention provides a VR resolver including a rotor, a stator core, an insulator, a stator coil, terminal pins, and a cover. The stator core is provided with a plurality of salient poles. The insulator insulates the stator core. The stator coil is wound to the salient poles of the stator core via the insulator and has end portions. The terminal pins are formed together with the insulator and are connected with the end portions of the stator coil. The cover covers the terminal pins so that the terminal pins are not exposed to the outside. The insulator and the cover form a hollow portion therebetween, and the hollow portion is filled with a non-conductive material.

According to the first aspect of the present invention, the hollow portion formed by the stator and the cover is filled with the non-conductive material. Therefore, the terminal pins connected with the end portions of the stator coil are covered with the non-conductive material and are thereby protected. In addition, the outside of the terminal pins are covered by the cover, thereby being protected. According to this structure, since the outermost of the terminal pins is covered by the cover, external load is not directly applied to the terminal pins. Moreover, since the terminal pins connected with the end portions of the stator coil are buried in the non-conductive material, the terminal pins and wires connected thereto are not exposed to the air. Accordingly, entering of water drops, dust, and dirt, between the adjacent terminal pins from the outside is prevented.

According to the first aspect of the present invention, the space to be filled with the non-conductive material is limited to the area surrounding the terminal pins, whereby the amount of the non-conductive material can be reduced. In general, as the non-conductive material, a fluid resin material may be used, and it is used by hardening later. Since the space to be filled is limited to the terminal portion, filling failure such as generation of partial gaps is prevented. That is, if the space to be filled has a large volume or a complicated shape, a possibility of filling failure due to hardening of resin during filling, and the possibility of generation of gaps, are increased. On the other hand, in the present invention, since filling of the non-conductive material is limited to the area surrounding the terminal pins, generation of such problems is reduced. In this connection, according to the structure of the present invention, the filling step is easily performed, whereby the production cost can be decreased.

According to a second aspect of the present invention, in the invention according to the first aspect of the present invention, the non-conductive material may be resin. For example, varnish may be used as the resin.

According to the second aspect of the present invention, since the non-conductive material is made of resin, the non-conductive material has superior fluidity and is thereby more efficiently injected.

According to a third aspect of the present invention, in the invention according to the first aspect of the present invention, the non-conductive material may be resin that is to be applied to the stator coil, According to the third aspect of the present invention, while the resin is applied to the stator coil for fixing and protecting, the terminal pin portion is coated with the resin simultaneously. As the resin to be applied to the stator coil, it is necessary to use a resin with low viscosity because the resin must infiltrate into spaces between the wound wires. The vicinity of the terminal pins is covered by the cover, and the hollow portion is formed. Therefore, according to the third aspect of the present invention, by injecting the resin into the hollow portion, the space is easily filled with the resin.

According to a fourth aspect of the present invention, in the invention according to the first aspect of the present invention, the cover may have an engaging portion which is engageable with a part of the insulator. According to the fourth aspect of the present invention, by engaging the engaging portion with the part of the insulator, the cover is mounted to the insulator. The mounting of the cover by the engaging structure is easy, whereby high productivity and reduction of the production cost can be performed.

According to a fifth aspect of the present invention, in the fourth aspect of the present invention, the insulator may be divided into two parts. One part of the insulator has a base that is arranged with the terminal pins. The other part of the insulator has a support that is provided with a recess. The two parts of the insulator hold the stator core therebetween while the base and the support contact with each other. In this case, the cover that covers the terminal pins is mounted on the base, and the engaging portion of the cover engages with the recess of the support.

According to the fifth aspect of the present invention, although it is simple, a structure in which the terminal pins are covered by the cover is obtained. In addition, a structure having the following advantages is obtained. That is, the cover is easily mounted, and the non-conductive material such as resin is efficiently filled into the hollow portion formed by the insulator and the cover.

According to the present invention, in the VR resolver provided with the terminal pins at the insulator, deformation of the terminal pins, shorting between the terminal pins, and contact failure at portions of the terminal pins, are prevented.

PREFERRED EMBODIMENTS OF THE INVENTION

Structure

Figure 1:
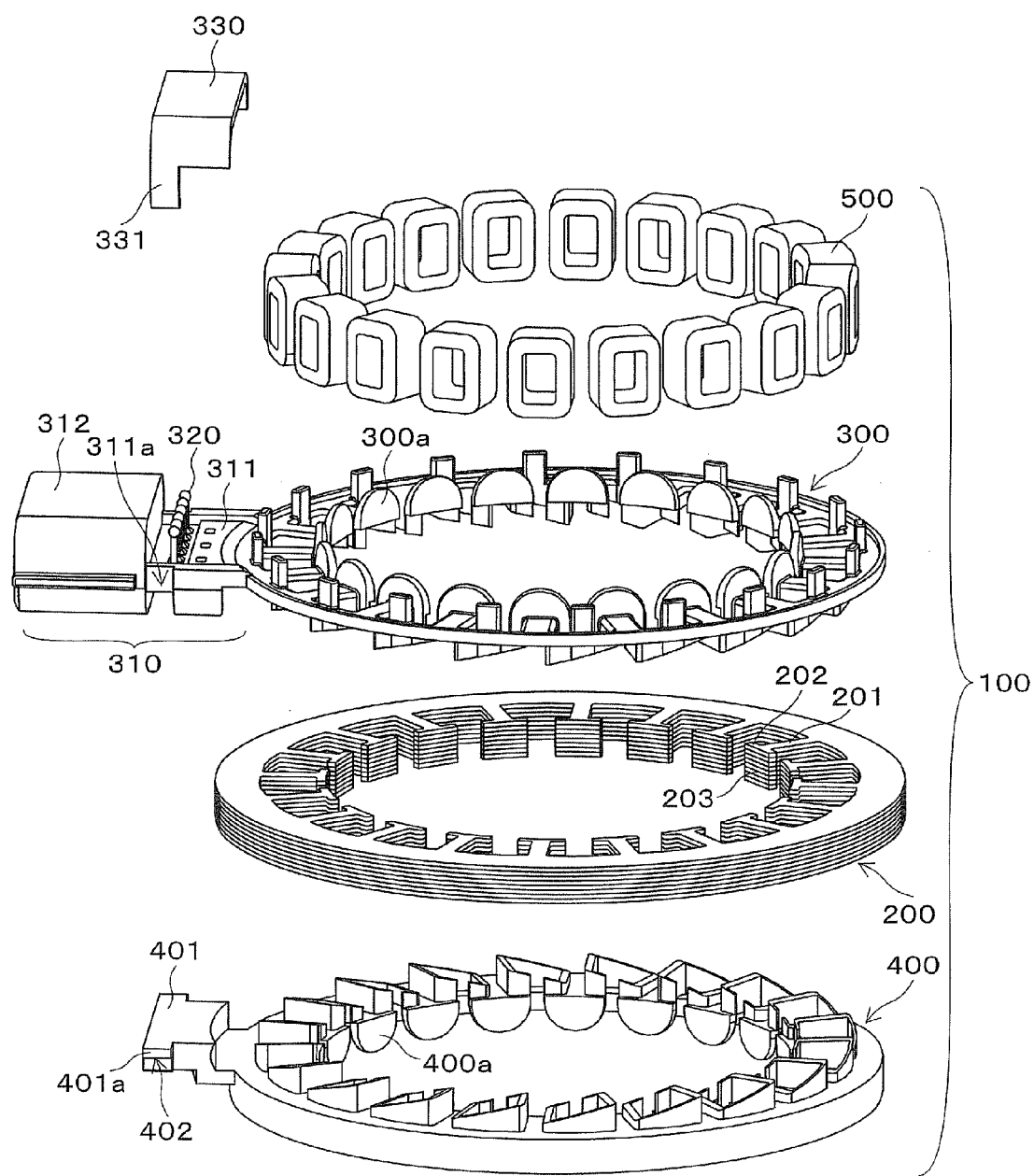
FIG. 1 is an exploded perspective view of a stator of an embodiment.

FIG. 1 shows an exploded perspective view of a stator 100 of a VR resolver of an embodiment, which is exploded in an axial direction. The stator 100 has an approximately circular shape. A rotor made of a soft magnetic material is rotatably held inside the stator 100. The structure of the rotor is the same as that of a rotor of an ordinary VR resolver. Therefore, the rotor is not shown in the figures, and descriptions thereof are omitted.

The stator 100 has a stator core 200. The stator core 200 is formed by laminating plural sheets in the axial direction. The sheet is made of a soft magnetic material (for example, a silicon steel sheet) and is formed into the shape shown in FIG. 1 by punching. The stator core 200 has plural salient poles 201 that extend to the center of the axis. The salient poles 201 function as magnetic poles, and they are wound with wires via an insulator, whereby a stator coil is formed. The insulator will be described later. FIG. 1 shows a stator coil 500 that is virtually removed from the salient poles 201. The salient pole 201 is provided with a salient pole top end 202 at a top portion, and the salient pole top end 202 flatly extends in the circumferential direction. The salient pole top end 202 is provided with a salient pole surface 203 that faces the rotor (not shown in FIG. 1), at an inside surface in the direction to the center of the axis.

The insulator mounted to the stator core 200 is separated into a first insulator 300 and a second insulator 400. The stator core 200 is sandwiched between the first insulator 300 and the second insulator 400 in the axial direction. Alternatively, the first insulator 300 and the second insulator 400 may be formed together while holding the stator core 200 therebetween. The first insulator 300 and the second insulator 400 are formed by a mold forming method (injection molding method) using an electrical insulating plastic resin material. The first insulator 300 and the second insulator 400 are used for obtaining electrical insulation between the windings (wires) of the stator coil 500 and the stator core 200 and surrounding members when mounted.

Figure 2:
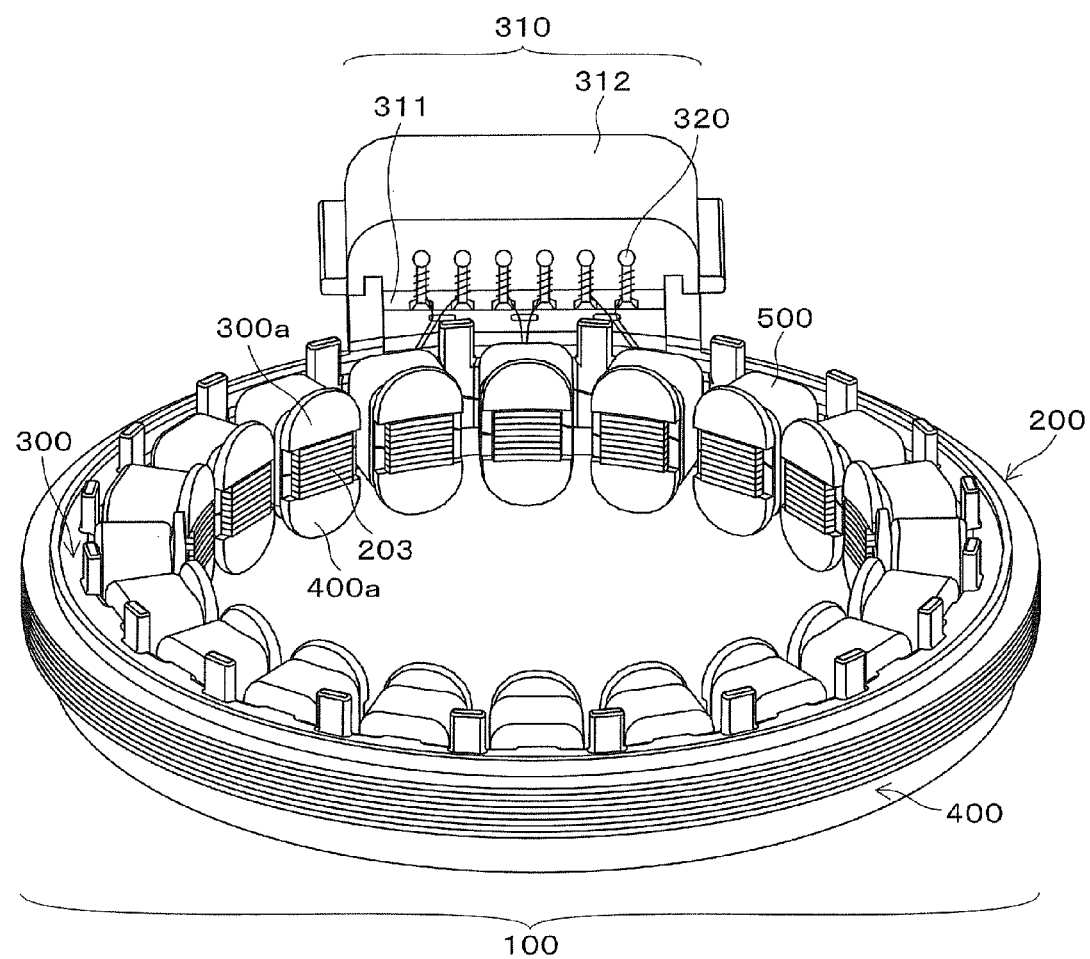
FIG. 2 is a perspective view of a stator of an embodiment before a cover is inserted.
Figure 3:
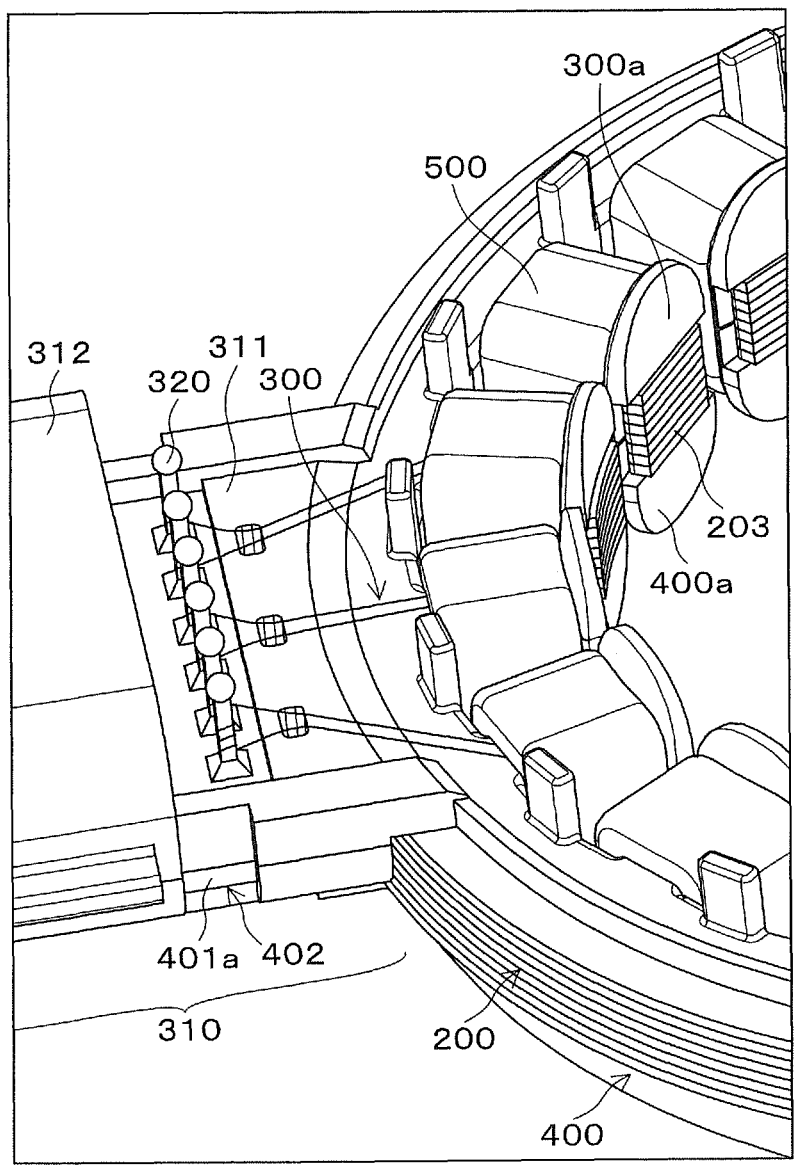
FIG. 3 is an enlarged perspective view of a terminal pin portion of an embodiment.

FIGS. 2 and 3 show the stator 100 having the components shown in FIG. 1. In the stator 100, the stator core 200 is mounted with the first insulator 300 and the second insulator 400, which are connected in the axial direction. The salient poles 201 are covered with the first insulator 300 and the second insulator 400 and are wound with wires, whereby the stator coil 500 is formed. In this condition, the stator coil 500 is wound to each of the salient poles 201. FIGS. 1 to 3 show a part of the first insulator 300 by a reference numeral 300a. The part 300a of the first insulator 300 covers a part of the salient pole top ends 202 and functions as a flange for holding end surfaces of the stator coil 500. Moreover, a part of the second insulator 400 having the same function as that of the part 300a of the first insulator 300 is indicated by reference numeral 400a. The stator coil 500 includes an exciting coil, a sine phase detection coil, and a cosine phase detection coil. The arrangement and the connecting condition of these coils are the same as in the case of an ordinary VR resolver, and the descriptions thereof are therefore omitted.

The first insulator 300 is formed with a connector 310 together at a part of the outer circumference thereof. The connector 310 includes a terminal pin base 311 that extends in a direction away from the first insulator 300 and includes a connector terminal cover 312 at an end of the terminal pin base 311. The terminal pin base 311 is arranged with six terminal pins 320 that extend in the axial direction and have predetermined spaces therebetween.

As shown in FIGS. 1 and 3, the second insulator 400 is provided with a connector support 401. The connector support 401 is provided at a position so as to contact the terminal pin base 311 of the first insulator 300 when the first insulator 300 and the second insulator 400 are fitted together while holding the stator core 200 therebetween. The connector support 401 is formed together with the second insulator 400 as a part of the second insulator 400. In the connector support 401, a portion indicated by a reference numeral 401a slightly outwardly projects, and a recess 402 is formed at a lower edge of the portion 401a. As described later, when a cover 330 is mounted, an engaging portion 331 of the cover 330 engages with the recess 402. In the case of forming the first insulator 300 and the second insulator 400 together, the connector support 401 and the recess 402 are also simultaneously formed. Therefore, even in this case, when the cover 330 is mounted, the engaging portion 331 of the cover 330 engages with the recess 402.

Figure 9:
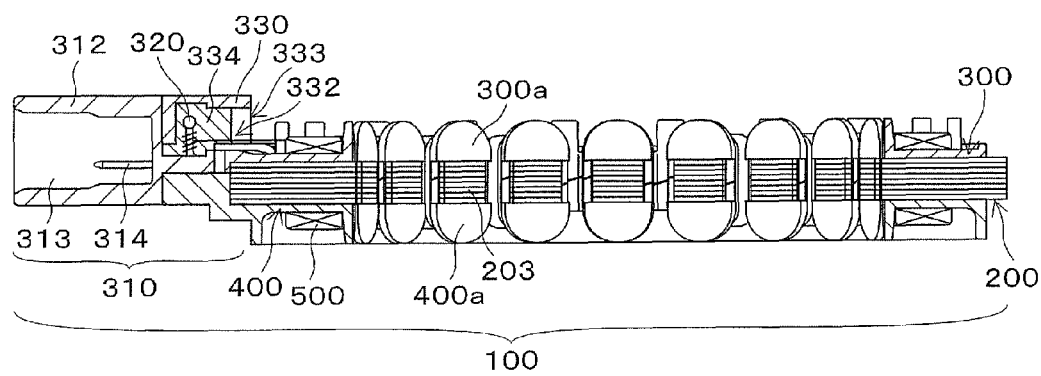
FIG. 9 is a cross section of a finished stator of an embodiment.

End portions of leads of the exciting coil, end portions of leads of the sine phase detection coil, and end portions of leads of the cosine phase detection coil, of the stator coil 500 are wound and connected with the terminal pins 320. Among the six terminal pins 320, two are for the exciting coil, two are for the sine phase detection coil, and two are for the cosine phase detection coil. The terminal pins 320 are connected with a connector terminal 314 that is arranged inside the connector terminal cover 312. The connector terminal 314 is hidden by the connector terminal cover 312 and thereby cannot be viewed in FIGS. 1 to 3, but is shown in FIG. 9, which is described later. The connector terminal cover 312 is formed so as to be connected with a mating terminal which is not shown in figures. Supply of exciting current, output of sine phase output signal, and output of cosine phase output signal, are performed via the mating terminal.

The terminal pins 320 are formed together with the first insulator 300 by insert molding. That is, a mold for forming the first insulator 300 is prepared, and metal members for the connector terminal 314 and the terminal pins 320 are arranged inside the mold as insert materials. In this condition, injection molding is performed by using plastic resin, whereby the terminal pins 320 are buried and are formed together with the first insulator 300.

FIG. 1 shows a reference numeral 330 that indicates a cover made of plastic resin. The cover 330 covers a top portion of the terminal pin base 311, and the cover 330 covering the terminal pins 320 is mounted to the first insulator 300 and the second insulator 400. The cover 330 includes an engaging portion 331 at both sides (only an engaging portion 331 at one side is shown in FIG. 1). Each of the engaging portions 331 has a claw structure at an end. In a condition in which the terminal pin base 311 of the first insulator 300 contacts with the connector support 401 of the second insulator 400, the engaging portion 331 is inserted from the upper side in FIG. 1 to a portion indicated by reference numeral 311a in FIG. 1. As a result, the claw structure of the engaging portion 331 is hooked and is engaged with the recess 402 of the connector support 401 of the second insulator 400. Similarly, in the case of forming the first insulator 300 and the second insulator 400 together, the cover 330 is hooked and is engaged with the recess 402. According to this engagement, the cover 330 covering the top portion and the sides of the terminal pins 320 is secured to the connector support 401 while the cover 330 and the connector support 401 hold the terminal pin base 311 therebetween. In addition, according to this securing, a structure in which the connector support 401 upwardly supports the connector 310 is obtained. This condition is shown in FIGS. 4 to 6.

Figure 4:
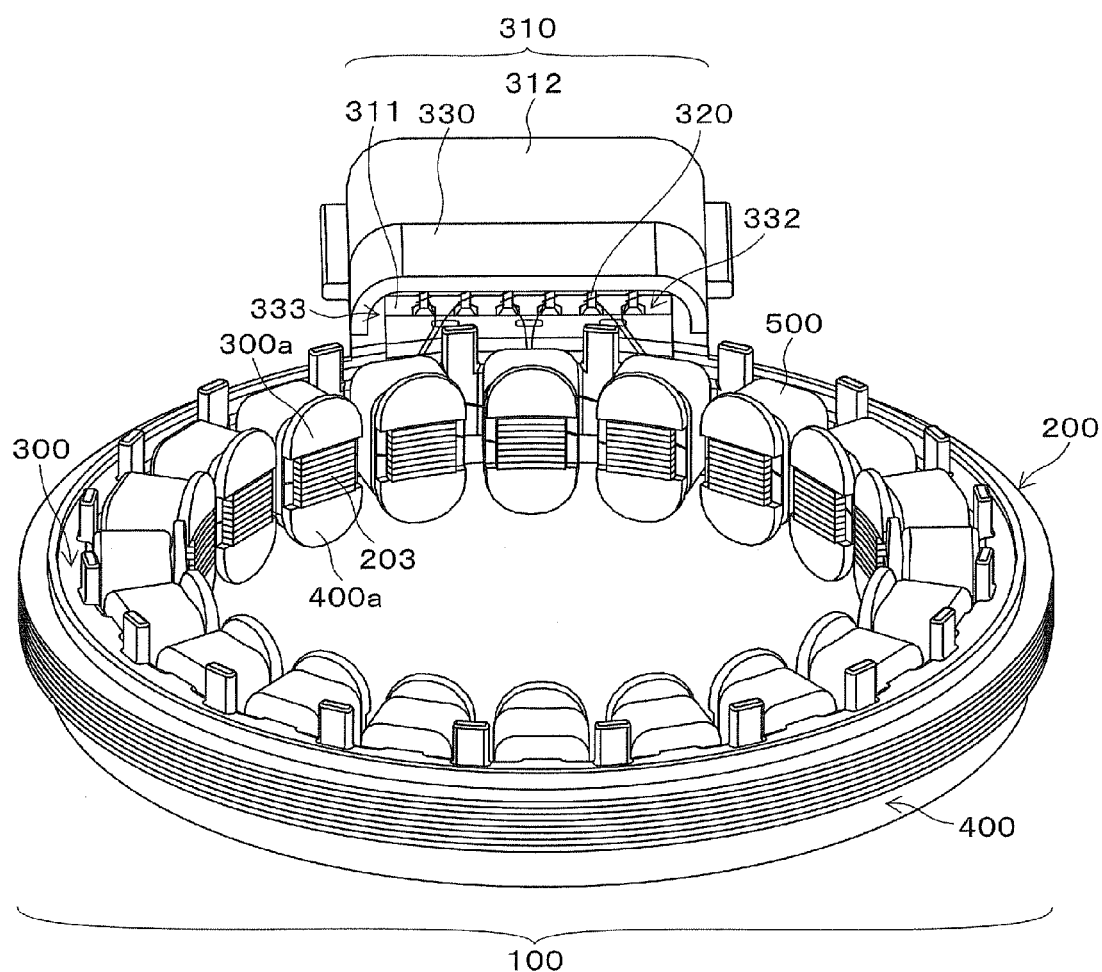
FIG. 4 is a perspective view of a stator of an embodiment after a cover is inserted.
Figure 5:
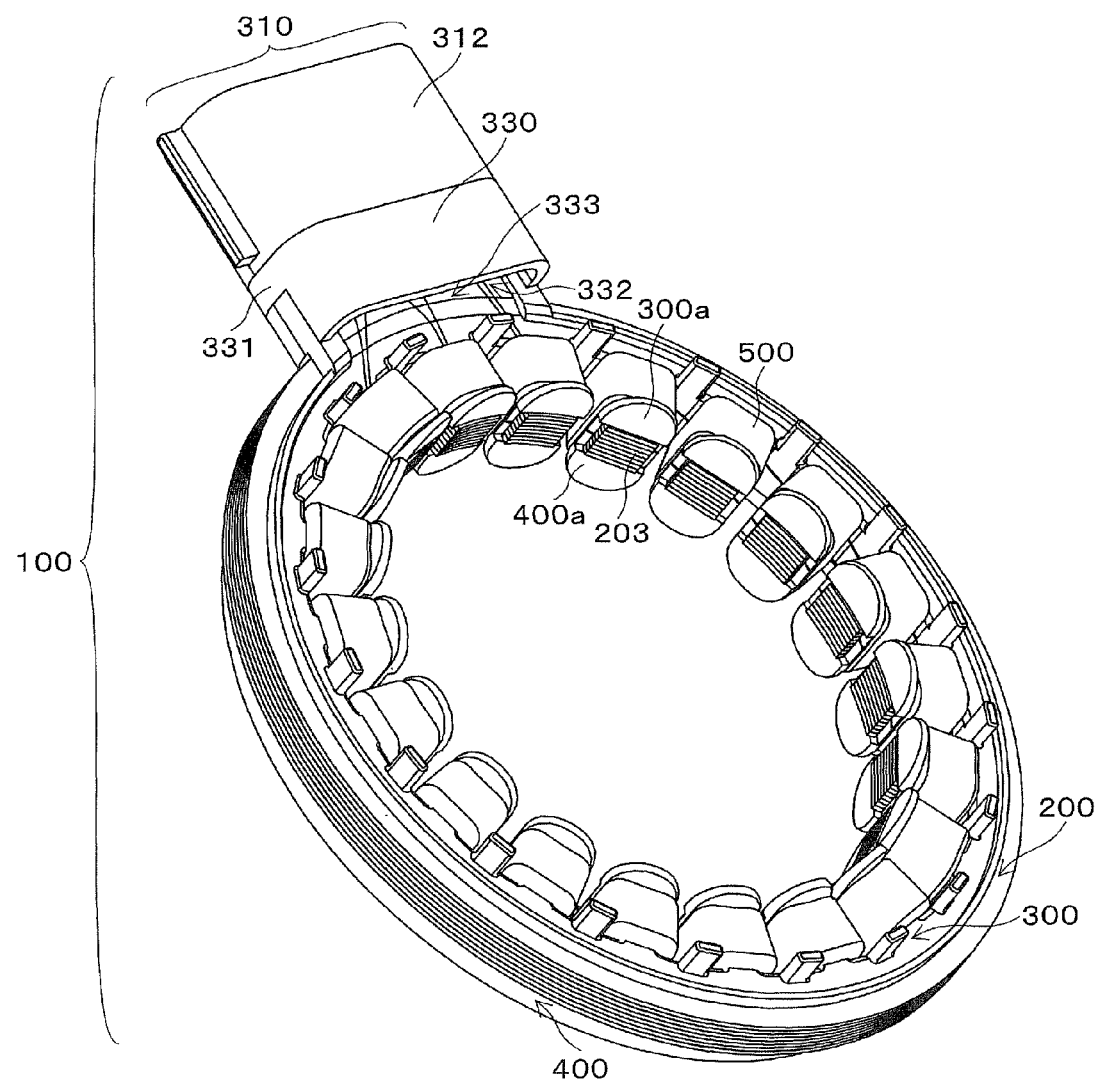
FIG. 5 is a second perspective view of a stator of an embodiment after a cover is inserted.
Figure 6:
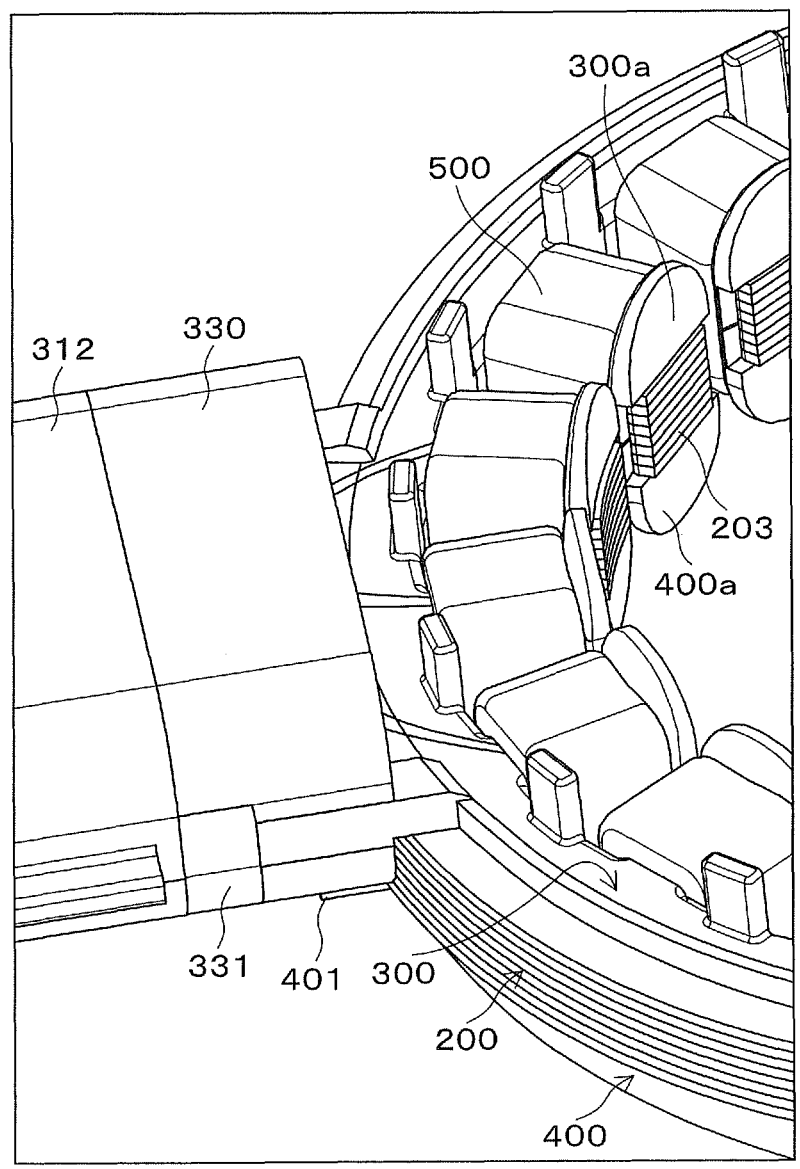
FIG. 6 is an enlarged perspective view of a stator of an embodiment after a cover is inserted.

In a condition in which the cover 330 is mounted to the terminal pin base 311 as shown in FIGS. 4 to 6, a hollow portion 332 is formed at a space surrounded by the terminal pin base 311 and the cover 330. In this embodiment, the stator 100 has an opening 333 at a position facing the stator coil 500 at the hollow portion 332. The opening 333 may be provided at an appropriate position according to the arrangement of the terminal pins and the shape of the cover 330. The hollow portion 332 is to be filled with resin as an example of a non-conductive material via the opening 333.

Figure 7:
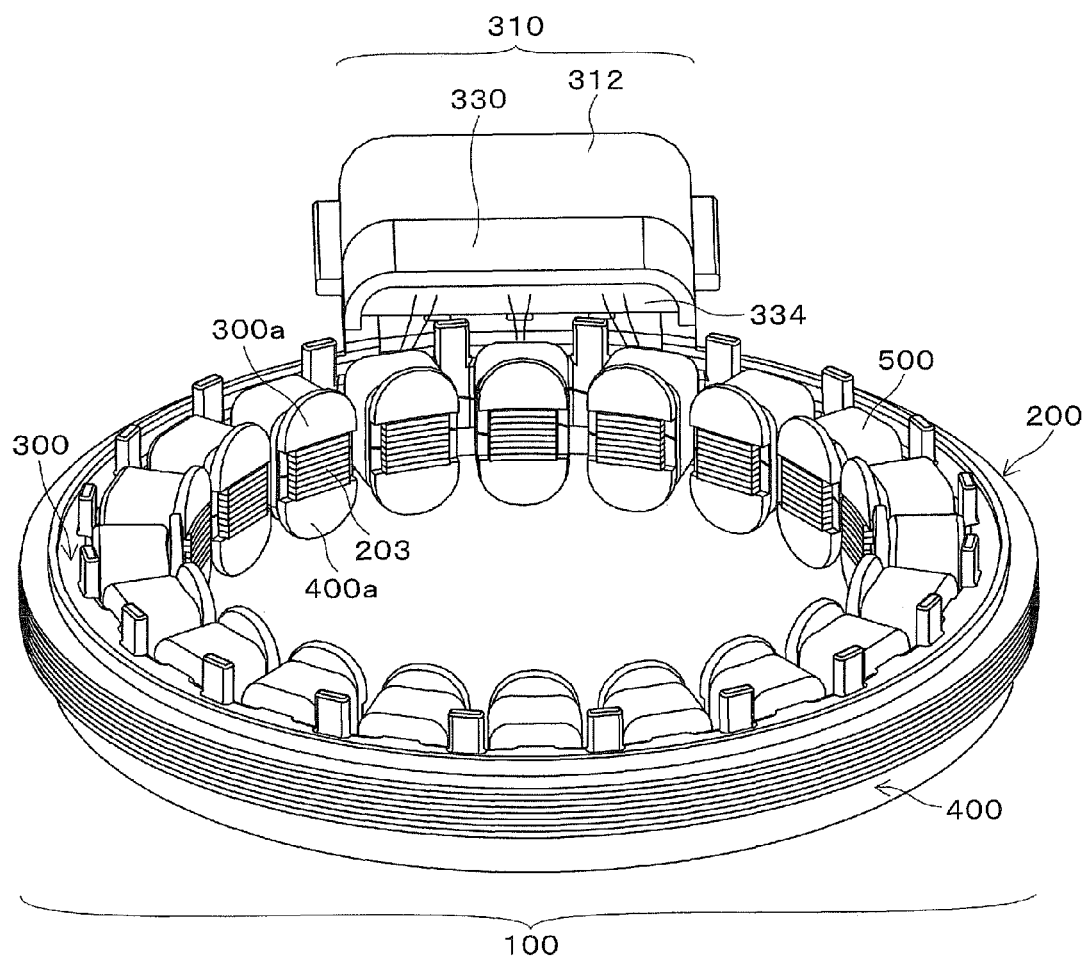
FIG. 7 is a perspective view of a stator of an embodiment after a non-conductive material is injected.
Figure 8:
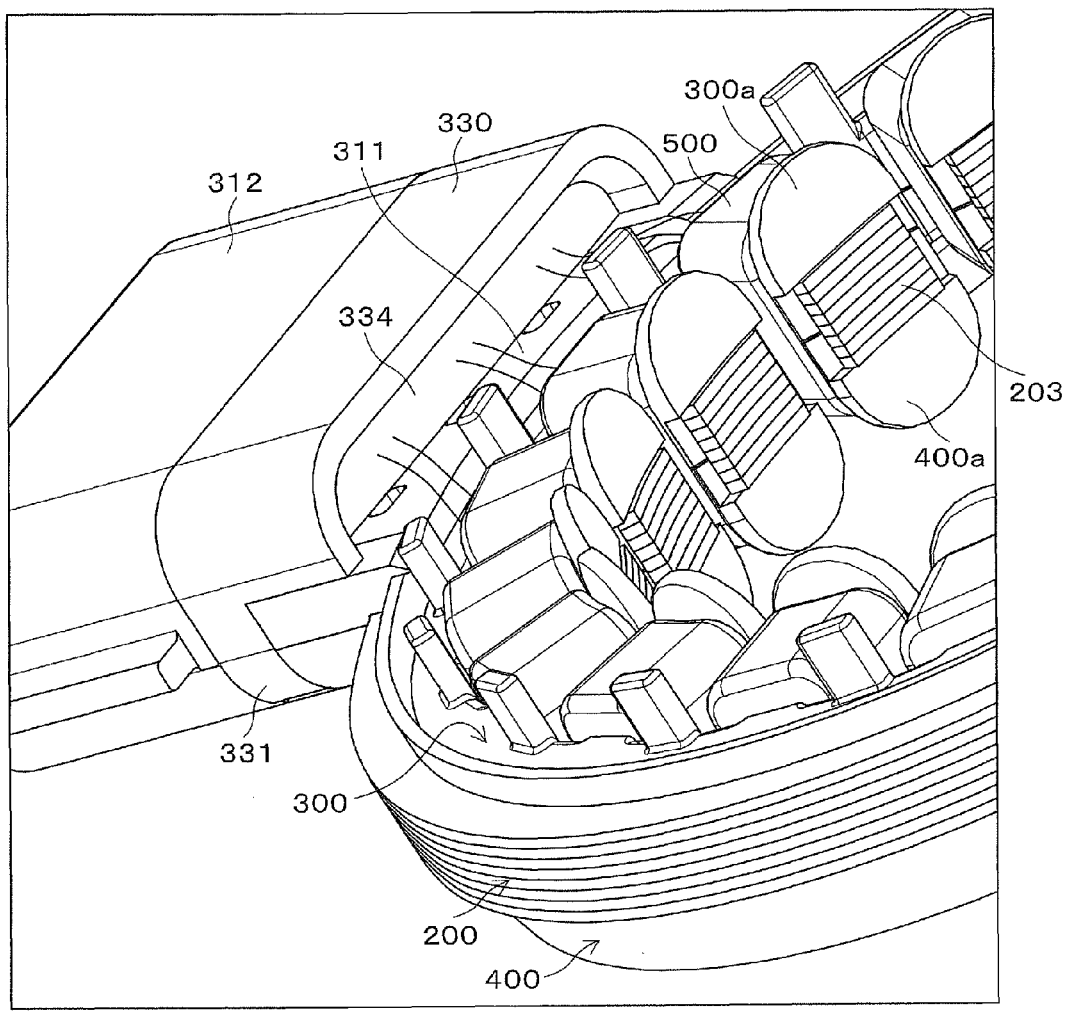
FIG. 8 is an enlarged perspective view of a portion filled with a non-conductive material in an embodiment.

FIGS. 7 to 9 show resin 334 that is filled into the hollow portion 332 and is hardened. The terminal pins 320 are buried in the resin 334 that fills the hollow portion 332, thereby being cut off from the air and being sealed. The end portions of the windings wound to the stator coil 500 are wrapped to the terminal pins 320 and are fixed by soldering or welding. The windings that are wound and fixed to the terminal pins 320 are sealed in the resin 334. The resin 334 may be the same as resin that is to be applied to the stator coil 500 so as to fix and protect the windings of the stator coil 500.

Example of Assembling Procedure

An example of a procedure for assembling the stator 100 of the VR resolver, which is shown in FIG. 1 in exploded perspective view, will be described hereinafter. First, plural sheets are prepared by press cutting silica steel sheets into the shape shown in FIG. 1. By laminating the sheets, the stator core 200 is obtained. Then, the stator core 200 is held between the first insulator 300 and the second insulator 400. In the case of forming the first insulator 300 and the second insulator 400 together, after the stator core 200 is formed, the stator core 200 is put in a mold, and insert molding is performed. In this condition, the salient poles 201 of the stator core 200 are wound with wires, whereby the stator coil 500 is formed. Then, end portions of the stator coil 500 are wound to the terminal pins 320, and the wound portions are fixed by soldering or welding. Thus, the stator 100 in the condition shown in FIGS. 2 and 3 is obtained.

After the stator 100 in the condition shown in FIGS. 2 and 3 is obtained, the cover 330 is mounted, and the stator 100 in the condition shown in FIGS. 4 to 6 is obtained. Next, by applying resin to the stator coil 500, the windings are fixed and protected by a coating of the resin. In this step, the same resin is poured into the hollow portion 332 from the opening 333 shown in FIGS. 4 and 5 and is hardened, whereby the filled resin 334 is obtained. Accordingly, the stator 100 in the condition shown in FIGS. 7 to 9 is obtained.

Advantages

The end portions of the stator coil 500 are connected with the terminal pins 320, and the terminal pins 320 are covered and protected by the cover 330. Moreover, the terminal pins 320 are sealed by filling resin inside the cover 330. According to this structure, since the outermost of the terminal pins 320 is covered by the cover 330, external load is not directly applied to the terminal pins 320. The terminal pins 320 that are connected with the end portions of the stator coil 500 are buried in the hardened resin. Therefore, the terminal pins 320 and the wires connected thereto are not exposed to the air, and entering of water drops, dust, and dirt from the outside to the terminal pins 230 is prevented.

The space to be filled with the resin is limited to the area surrounding the terminal pins 320 (the hollow portion 332), whereby the amount of the resin can be reduced. Moreover, since the space to be filled with the resin is limited to the vicinity of the terminal pins 320, filling failure such as generation of partial gaps is prevented at the portion filled with the resin. Furthermore, since the resin must be filled into only the limited space, the filling step of the resin is simplified and is thereby efficiently performed. These advantages are favorable in reducing the production cost.

When the resin is applied for fixing and protecting the stator coil 500, the resin is filled into the hollow portion 332. The resin that is applied to the stator coil 500 must infiltrate into spaces between the wound wires, and therefore, it is necessary that the resin have low viscosity of appropriate degree. In view of this, the hollow portion 332 is required to be airtight so that the injected resin does not leak. In this embodiment, the hollow portion 332 is formed in the vicinity of the area arranged with the six terminal pins 320 and thereby has a limited volume and a simple shape. Therefore, the airtightness against the leakage of the resin is easily obtained. Specifically, since the opening 333 opens in one direction, filling of the resin is easy, and the resin does not easily flow to undesirable portions and does not easily drop. For these reasons, the efficiency and productivity in filling of the resin are high.

The stator core 200 is held between the insulators 300 and 400 that are separate parts. In this condition, the terminal pin base 311 is covered by the cover 300, and the cover 330 is secured to the insulators 300 and 400 by engaging the engaging portion 331 with the recess 402 of the connector support

401. According to this structure, although it is simple, a structure in which the terminal pins 320 are covered by the cover 330 is obtained. In addition, a structure having the following advantages is obtained. That is, the cover 330 is easily mounted, and the resin is efficiently filled into the hollow portion 332 inside the cover 330.

The embodiments of the present invention are not limited to each of the above embodiments and include various modifications that may be anticipated by a person skilled in the art. In addition, the effects of the present invention are also not limited to the descriptions above. That is, various additions, changes, and partial deletions can be performed in a range that does not exceed the general concept and object of the present invention, which are according to what is claimed in the Claims and equivalents thereof.

The present invention can be used for VR resolvers.

What is claimed is:

1. A variable reluctance resolver comprising:
   a rotor;
   a circular stator core provided with a plurality of salient poles;
   a circular insulator insulating the stator core;
   a stator coil wound to the salient poles of the stator core via the insulator and having end portions;
   a base formed together with the circular insulator at a radially outside location of the circular insulator and extending away from the circular insulator;
   terminal pins that are arranged on the base and are connected with the end portions of the stator coil; and
   a cover that is mounted to the base and covers the terminal pins so that the terminal pins are not exposed to the outside,
   wherein the base and the cover form a hollow portion therebetween, and the hollow portion is filled with a non-conductive material as a filler,
   the hollow portion faces the stator coil and includes an opening disposed between the terminal pins and the stator coil,
   leads of the stator coil are extended into an inside of the hollow portion through the opening and connected to the terminal pins,
   the terminal pins and the leads of the stator coil, which are connected to the terminal pins, are sealed in the filler of the non-conductive material in the hollow portion, and
   an end surface of the filler of the non-conductive material in the hollow portion is positioned at the opening.

2. The variable reluctance resolver according to claim 1, wherein the non-conductive material is a resin.

3. The variable reluctance resolver according to claim 1, wherein the non-conductive material is a resin that is to be applied to the stator coil.

4. The variable reluctance resolver according to claim 1, wherein the cover includes an engaging portion so as to engage with a part of the circular insulator.

5. The variable reluctance resolver according to claim 4, wherein the insulator is divided into two parts,
   one part of the insulator has a base that is arranged with the terminal pins, the other part of the insulator has a support that is provided with a recess,
   the two parts of the insulator hold the stator core therebetween while the base and the support contact with each other,
   the cover that covers the terminal pins is mounted on the base, and
   the engaging portion of the cover engages with the recess of the support.

* * * * *